US012560885B2

(12) United States Patent
Saito et al.

(10) Patent No.: US 12,560,885 B2
(45) Date of Patent: Feb. 24, 2026

(54) CONDUCTIVE SUBSTRATE FOR ELECTROPHOTOGRAPHIC PHOTORECEPTOR, ELECTROPHOTOGRAPHIC PHOTORECEPTOR, PROCESS CARTRIDGE, IMAGE FORMING APPARATUS, AND METHOD FOR MANUFACTURING CONDUCTIVE SUBSTRATE FOR ELECTROPHOTOGRAPHIC PHOTORECEPTOR

(71) Applicant: FUJIFILM Business Innovation Corp., Tokyo (JP)

(72) Inventors: Yohei Saito, Kanagawa (JP); Hiroaki Ogawa, Kanagawa (JP); Jiro Korenaga, Kanagawa (JP); Takuma Suzuki, Kanagawa (JP); Hiroshi Kai, Kanagawa (JP); Chisato Imamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/826,518

(22) Filed: Sep. 6, 2024

(65) Prior Publication Data

US 2025/0271808 A1 Aug. 28, 2025

(30) Foreign Application Priority Data

Feb. 27, 2024 (JP) ................................ 2024-027812

(51) Int. Cl.

| | |
|---|---|
| ***G03G 15/00*** | (2006.01) |
| ***G03G 5/047*** | (2006.01) |
| ***G03G 5/06*** | (2006.01) |
| ***G03G 5/07*** | (2006.01) |
| ***G03G 5/10*** | (2006.01) |
| ***G03G 21/18*** | (2006.01) |

(52) U.S. Cl.

CPC ........... *G03G 15/751* (2013.01); *G03G 5/047* (2013.01); *G03G 5/0661* (2013.01); *G03G 5/071* (2013.01); *G03G 5/075* (2013.01); *G03G 5/102* (2013.01); *G03G 21/1814* (2013.01)

(58) Field of Classification Search

CPC ...... G03G 5/047; G03G 5/0661; G03G 5/071; G03G 5/075; G03G 5/10; G03G 5/102; G03G 15/751; G03G 21/1814

See application file for complete search history.

(56) References Cited

U.S. PATENT DOCUMENTS 10,795,276 B1 * 10/2020 Rokutan ............ G03G 21/1814
2003/0079633 A1 * 5/2003 Sang, Jr. .................. B41N 7/00 101/375
2005/0118520 A1 * 6/2005 Takeshima ............... G03G 5/10 430/60

FOREIGN PATENT DOCUMENTS

JP H06-095559 A 4/1994

* cited by examiner

*Primary Examiner* — Sophia S Chen
(74) *Attorney, Agent, or Firm* — Oliff PLC

(57) ABSTRACT

A conductive substrate for an electrophotographic photoreceptor includes a cylindrical conductive substrate, in which in a power spectrum obtained through fast Fourier transform of the roughness profile in the axial direction of the inner circumferential surface of the conductive substrate at both end portions in the axial direction, the sum S of intensity within the period range of 0.01 mm to 0.1 mm is 0.02 or greater and 0.10 or less.

9 Claims, 3 Drawing Sheets

CONDUCTIVE SUBSTRATE FOR ELECTROPHOTOGRAPHIC PHOTORECEPTOR, ELECTROPHOTOGRAPHIC PHOTORECEPTOR, PROCESS CARTRIDGE, IMAGE FORMING APPARATUS, AND METHOD FOR MANUFACTURING CONDUCTIVE SUBSTRATE FOR ELECTROPHOTOGRAPHIC PHOTORECEPTOR

CROSS-REFERENCE TO RELATED APPLICATIONS

This application is based on and claims priority under 35 USC 119 from Japanese Patent Application No. 2024-027812 filed Feb. 27, 2024.

BACKGROUND

(i) Technical Field

The present disclosure relates to a conductive substrate for an electrophotographic photoreceptor, an electrophotographic photoreceptor, a process cartridge, an image forming apparatus, and a method for manufacturing a conductive substrate for an electrophotographic photoreceptor.

(ii) Related Art

In Japanese Unexamined Patent Application Publication No. 06-095559, there is disclosed an image forming member that is free from the rotation of a photosensitive member without engagement with a support member attached thereto even when exposed to a temperature of approximately −50° C.

SUMMARY

Aspects of non-limiting embodiments of the present disclosure relate to a conductive substrate for an electrophotographic photoreceptor that includes a cylindrical conductive substrate and that may experience reduced wobbling during rotation compared with a conductive substrate for an electrophotographic photoreceptor for which the sum S of intensity within the period range of 0.01 mm to 0.1 mm in a power spectrum obtained through fast Fourier transform of the roughness profile in the axial direction of the inner circumferential surface of the conductive substrate at both end portions in the axial direction is less than 0.02 or exceeds 0.10.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a conductive substrate for an electrophotographic photoreceptor, the conductive substrate including a cylindrical conductive substrate, wherein: in a power spectrum obtained through fast Fourier transform of a roughness profile in an axial direction of an inner circumferential surface of the conductive substrate at both end portions in the axial direction, a sum S of intensity within a period range of 0.01 mm to 0.1 mm is 0.02 or greater and 0.10 or less.

BRIEF DESCRIPTION OF THE DRAWINGS

Exemplary embodiments of the present disclosure will be described in detail based on the following figures, wherein.

DETAILED DESCRIPTION

Figure 1:
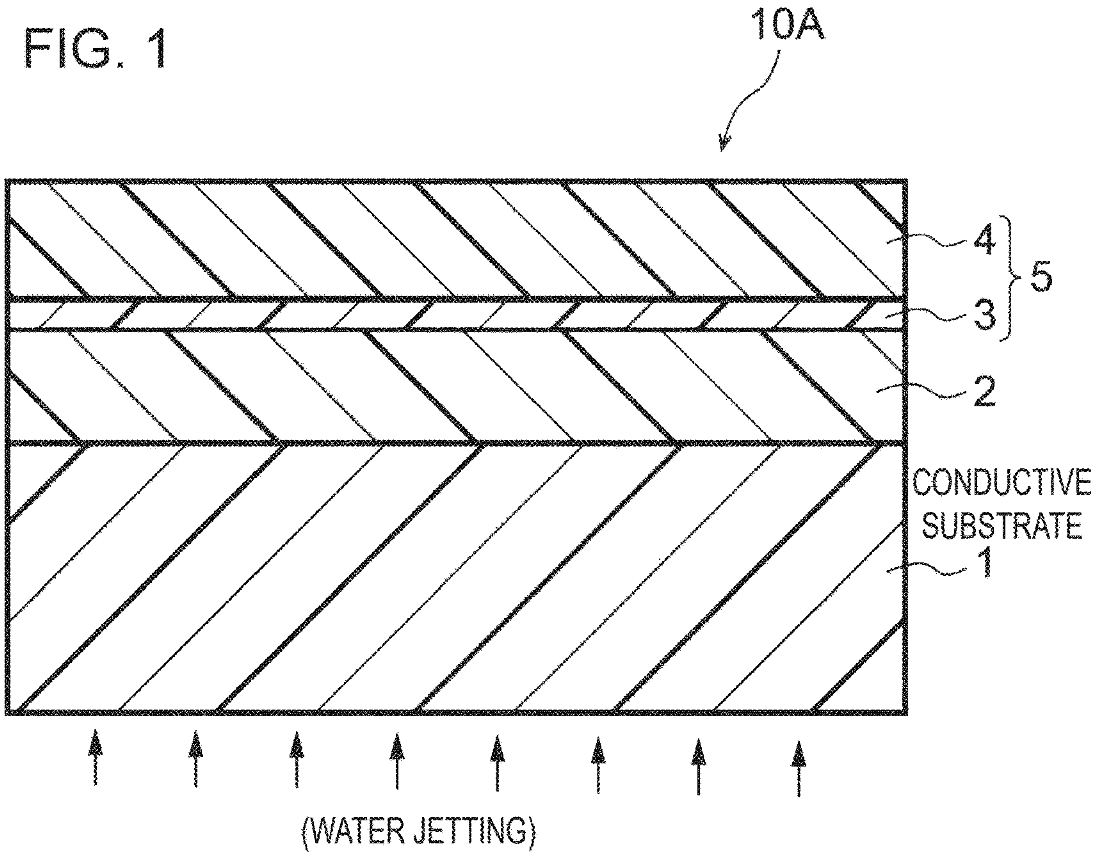
FIG. 1 is a partial cross-sectional view illustrating an example of a layer structure of an electrophotographic photoreceptor according to an exemplary embodiment.

Exemplary embodiments of the present disclosure will now be described. These descriptions and the Examples are intended to illustrate exemplary embodiments and not intended to limit the scope of the exemplary embodiments.

Numerical ranges specified herein with “A-B,” “between A and B,” “(from) A to B,” etc., represent ranges that include values A and B as the minimum and the maximum, respectively.

In a series of numerical ranges presented herein, an upper or lower limit specified in one numerical range may be substituted with the upper or lower limit of another numerical range in the same series. In a numerical range presented herein, furthermore, the upper or lower limit of the numerical range may be substituted with a value indicated in the Examples.

As used herein, the word “step” refers not only to an independent step; even if a step is not clearly differentiated from another, the step is included in this term as long as its intended purpose is fulfilled.

When an exemplary embodiment is described with reference to a drawing herein, the structure of the exemplary embodiment is not limited to the structure illustrated in the drawing. The size of elements in each drawing, furthermore, is conceptual; the relationship between the sizes of elements is not limited to what is illustrated.

A constituent herein may include multiple substances corresponding to it. When the amount of a constituent in a composition is mentioned herein, and if multiple substances corresponding to the constituent are present in the composition, the mentioned amount represents the total amount of the multiple substances present in the composition unless stated otherwise.

A constituent herein may include multiple types of particles corresponding to it. When multiple types of particles corresponding to a constituent are present in a composition, the particle diameter of the constituent is a value for the mixture of the multiple types of particles present in the composition unless stated otherwise.

As used herein, “the direction along the axis” or “the axial direction” refers to the direction in which the rotational axis of a conductive substrate extends, and “the direction along the radius” or “the radial direction” refers to the direction perpendicular to the rotational axis of a conductive substrate.

Herein, the sum of intensity within the period range of 0.01 mm to 0.1 mm in a power spectrum obtained through fast Fourier transform of the roughness profile in the axial direction of the inner circumferential surface of a conductive substrate at both end portions in the axial direction may be referred to simply as "the sum S."

Conductive Substrate for an Electrophotographic Photoreceptor

A conductive substrate according to an exemplary embodiment for an electrophotographic photoreceptor (Hereinafter also referred to as "conductive substrate.") includes a cylindrical conductive substrate, and the sum S of intensity within the period range of 0.01 mm to 0.1 mm in a power spectrum obtained through fast Fourier transform of the roughness profile in the axial direction of the inner circumferential surface of the conductive substrate at both end portions in the axial direction is 0.02 or greater and 0.10 or less. Configured in this manner, the conductive substrate may experience reduced wobbling during rotation when applied to an image forming apparatus. A possible reason is as follows.

When applied to an image forming apparatus, the conductive substrate according to this exemplary embodiment is used together with flanges. The flanges are used in a state in which they are fitted into the conductive substrate at both end portions in the direction along the axis of the conductive substrate, and play the role of transmitting the force that drives the rotational shaft, which passes through the center of the flanges, of the conductive substrate to rotate (torque). During rotation, however, the inner circumferential surface of the conductive substrate at both end portions in the axial direction can experience slight slippage or wobbling between the inner circumferential surface and the portions engaged with the flanges, depending on the roughness of the surface. Once shaking occurs, it leads to degradations in image quality (specifically, unevenness in image density).

The conductive substrate according to this exemplary embodiment employs the sum S as defined above as a measure of the surface characteristics of the inner circumferential surface of the conductive substrate at both end portions in the axial direction, and this sum S is set within a range in which the inner circumferential surface of the conductive substrate at both end portions in the axial direction is neither excessively rough nor excessively smooth. Presumably because of this, the conductive substrate according to this exemplary embodiment may experience reduced wobbling during rotation when applied to an image forming apparatus. Additionally, degradations in image quality (specifically, unevenness in image density) associated with shaking may also be mitigated.

Material and Other Details of the Conductive Substrate

The conductive substrate according to this exemplary embodiment includes a cylindrical (i.e., drum-shaped) conductive substrate.

Examples of materials for the conductive substrate include metals, such as aluminum, copper, zinc, chromium, nickel, molybdenum, vanadium, indium, gold, and platinum; alloys, such as stainless steel; conductive compounds, such as conductive polymers and indium oxide; a sheet of paper or a resin sheet coated, by application or deposition, or laminated with a metal or alloy. "Conductive" means that the volume resistivity is less than $1\times10^{13}$ Ω·cm.

The conductive substrate may be a newly manufactured one or may be a recycled one.

The conductive substrate may be one that has been subjected to, for example, acidic treatment or boehmite treatment.

Sum S

For the conductive substrate according to this exemplary embodiment, as stated above, the sum S of intensity within the period range of 0.01 mm to 0.1 mm in a power spectrum obtained through fast Fourier transform of the roughness profile in the axial direction of the inner circumferential surface of the conductive substrate at both end portions in the axial direction is 0.02 or greater and 0.10 or less. By virtue of the sum S falling within this range, wobbling during rotation may decrease. The sum S may be 0.03 or greater and 0.08 or less, preferably 0.035 or greater and 0.07 or less, more preferably 0.04 or greater and 0.06 or less. When the sum S falls within these ranges, wobbling during rotation may further decrease.

In this context, "the inner circumferential surface of the conductive substrate at both end portions in the axial direction" refers to the inner surfaces intended to come into contact with flanges.

The sum S can be determined through the procedure of (1) to (3) below.

(1) The roughness profile in the axial direction of the inner circumferential surface of the conductive substrate at both end portions in the axial direction is determined. The roughness profile is the roughness profile that JIS B0601: 2013 defines.

The roughness of the inner circumferential surface of the conductive substrate at both end portions in the axial direction is measured using a contact surface roughness gauge (SURFCOM 1400A, Tokyo Seimitsu Co., Ltd.) in an environment with a temperature of 23° C. and a relative humidity of 55%. The surface is scanned in the direction along the axis of the conductive substrate, and the scanning speed is 0.3 mm/sec, the measured length is 2.5 mm, and the cutoff value is 0.8 mm. The probe is a conical-type one with a vertex angle of 90°, with the radius of curvature of the tip being 5 μm and the material for the tip being diamond. Measurements are taken at three points, the middle in the axial direction and both ends of the image forming region. From the measured values at the three points, the roughness profile is determined.

(2) The roughness profile is subjected to fast Fourier transform, and thereby a power spectrum is derived.

As the analysis software, Microsoft Excel is used. From the roughness profile, the parameter in the height direction is extracted at 4096 points with a pitch of 0.6 μm. The data from the 4096 points is converted in such a manner that the average of the height data from the 4096 points will be 0. The parameter values from the 4096 points are subjected to fast Fourier transform, through which a power spectrum with period (mm) on the horizontal axis and intensity on the vertical axis is derived.

(3) By integrating the intensity within the period range of 0.01 mm to 0.1 mm in the power spectrum, the sum S is determined. The sum S is the sum of the power spectrum values from 0.01 mm to 0.1 mm.

Electrophotographic Photoreceptor

An electrophotographic photoreceptor (Hereinafter also referred to as "photoreceptor.") according to an exemplary embodiment includes a conductive substrate as described above and a photosensitive layer disposed on or above the conductive substrate. The electrophotographic photoreceptor according to this exemplary embodiment may include an undercoat layer between the conductive substrate and the photosensitive layer.

FIG. 1 is a partial cross-sectional view schematically illustrating an example of a layer structure of a photoreceptor according to this exemplary embodiment. The photoreceptor 10A illustrated in FIG. 1 has a multilayer photosensitive layer. The photoreceptor 10A has a structure in which an undercoat layer 2, a charge-generating layer 3, and a charge transport layer 4 are stacked in this order on a conductive substrate 1, and the charge-generating layer 3 and the charge transport layer 4 form a photosensitive layer 5 (so-called a functionally separated photosensitive layer). The photoreceptor 10A may have an intermediate layer (not illustrated) between the undercoat layer 2 and the charge-generating layer 3. The photoreceptor 10A may have a protective layer (not illustrated) on the charge transport layer 4.

Figure 2:
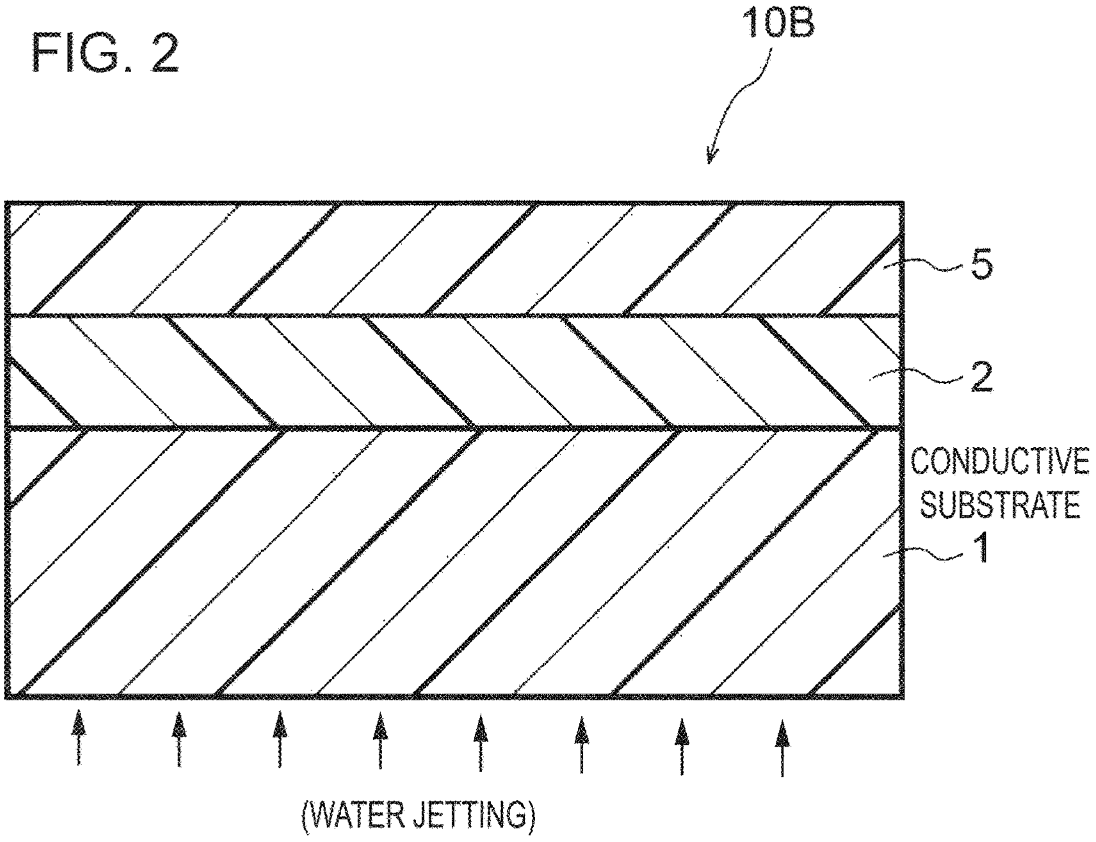
FIG. 2 is a partial cross-sectional view illustrating another example of a layer structure of an electrophotographic photoreceptor according to an exemplary embodiment.

FIG. 2 is a partial cross-sectional view schematically illustrating another example of a layer structure of a photoreceptor according to this exemplary embodiment. The photoreceptor 10B illustrated in FIG. 2 has a single-layer photosensitive layer. The photoreceptor 10B has a structure in which an undercoat layer 2 and a photosensitive layer 5 are stacked in this order on a conductive substrate 1. The photoreceptor 10B may have an intermediate layer (not illustrated) between the undercoat layer 2 and the photosensitive layer 5. The photoreceptor 10B may have a protective layer (not illustrated) on the photosensitive layer 5.

Each layer of the photoreceptor (excluding the conductive substrate) will now be described in detail.

Charge-Generating Layer

The charge-generating layer is, for example, a layer containing a charge-generating material and at least one binder resin. The charge-generating layer, furthermore, may be a deposited layer of a charge-generating material. The deposited layer of a charge-generating material may be employed when an incoherent light source, such as an LED (light-emitting diode) or organic EL (electroluminescence) image array, is used.

Examples of charge-generating materials include azo pigments, such as bisazo and trisazo pigments; annulated aromatic pigments, such as dibromoanthanthrone; perylene pigments; pyrrolopyrrole pigments; phthalocyanine pigments; zinc oxide; and trigonal selenium.

Of these, the charge-generating material may be a metal phthalocyanine pigment or non-metal phthalocyanine pigment in particular, if response to exposure to laser light in the near-infrared range is intended. Specifically, the charge-generating material may be, for example, hydroxygallium phthalocyanine; chlorogallium phthalocyanine; dichlorotin phthalocyanine; or titanyl phthalocyanine.

If response to exposure to laser light in the near-ultraviolet range is intended, on the other hand, the charge-generating material may be, for example, an annulated aromatic pigment, such as dibromoanthanthrone; a thioindigo pigment; a porphyrazine compound; zinc oxide; trigonal selenium; or a bisazo pigment.

Such charge-generating materials as listed above may be used even when an LED, organic EL image array, or other incoherent light source having its center wavelength of emission within the range of 450 nm to 780 nm is employed.

When an n-type semiconductor, such as an annulated aromatic pigment, perylene pigment, or azo pigment, is used as the charge-generating material, the charge-generating material does not easily produce dark current, and the image defect called black spots may be limited even when the photosensitive layer is formed as a thin film. As for the determination of whether the charge-generating material is n-type, it is determined based on the polarity of the photocurrent that flows through it using the commonly employed time-of-flight method; materials that allow electrons to flow as a carrier more easily than holes are considered n-type.

The binder resin used in the charge-generating layer is selected from a wide variety of insulating resins, and, furthermore, the binder resin may be selected from organic photoconductive polymers, such as poly-N-vinylcarbazole, polyvinylanthracene, polyvinylpyrene, and polysilanes.

Examples of binder resins include polyvinyl butyral resins, polyarylate resins (e.g., polycondensates of a bisphenol and an aromatic dicarboxylic acid), polycarbonate resins, polyester resins, phenoxy resins, vinyl chloride-vinyl acetate copolymers, polyamide resins, acrylic resins, polyacrylamide resins, polyvinylpyridine resins, cellulose resins, urethane resins, epoxy resins, casein, polyvinyl alcohol resins, and polyvinylpyrrolidone resins. In this context, “insulating” means that the volume resistivity is $10^{13}$ Ω·cm or more. One such binder resin alone or a mixture of two or more are used.

The blending ratio between the charge-generating material and the binder resin may be in the range of 10:1 to 1:10 as a ratio by mass.

In the charge-generating layer, known additives may also be contained.

In the formation of the charge-generating layer, there is no specific restriction, and known formation methods are utilized; however, for example, the process is performed by forming a coating of a coating solution for charge-generating layer formation, which is obtained by adding the ingredients described above to at least one solvent, drying this coating, and optionally heating the dried coating. The formation of the charge-generating layer may be performed through the deposition of the charge-generating material. The formation of the charge-generating layer through deposition may be employed particularly when the charge-generating material used is an annulated aromatic pigment or perylene pigment.

Examples of solvents for preparing the coating solution for charge-generating layer formation include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. One such solvent alone or a mixture of two or more are used.

The method for dispersing particles (e.g., the charge-generating material) in the coating solution for charge-generating layer formation is, for example, by the use of a medium disperser, such as a ball mill, vibration ball mill, attritor, sand mill, or horizontal sand mill, or a mediumless disperser, such as an agitator, sonicator, roller mill, or high-pressure homogenizer. Examples of high-pressure homogenizers include an impact homogenizer, which disperses the particles by causing liquid-liquid collisions or liquid-wall collisions of a dispersion in a high-pressure state, or a microfluidic homogenizer, which disperses the particles by forcing a fluid through a microchannel in a high-pressure state. During the dispersion process, the average particle diameter of the charge-generating material in the coating solution for charge-generating layer formation may be reduced to 0.5 μm or less, preferably 0.3 μm or less, more preferably 0.15 μm or less.

Examples of methods for applying the coating solution for charge-generating layer formation onto the undercoat layer (or onto the intermediate layer) include common methods, such as blade coating, wire bar coating, spray coating, dip coating, bead coating, air knife coating, and curtain coating.

The thickness of the charge-generating layer may be set within the range of 0.1 μm to 5.0 μm, preferably 0.2 μm to 2.0 μm.

Charge Transport Layer

The charge transport layer is, for example, a layer containing at least one charge transport material and at least one binder resin. The charge transport layer may be a layer containing a polymeric charge transport material.

Examples of charge transport materials include electron-transporting compounds, such as quinone compounds, e.g., p-benzoquinone, chloranil, bromanil, and anthraquinone; tetracyanoquinodimethane compounds; fluorenone compounds, e.g., 2,4,7-trinitrofluorenone; xanthone compounds; benzophenone compounds; cyanovinyl compounds; and ethylene compounds. Hole-transporting compounds, such as triarylamine compounds, benzidine compounds, arylalkane compounds, aryl-substituted ethylene compounds, stilbene compounds, anthracene compounds, and hydrazone compounds, are also examples of charge transport materials. One such charge transport material alone or two or more are used, but charge transport materials that can be used are not limited to these.

As the charge transport material, triarylamine derivatives indicated by structural formula (a-1) below and benzidine derivatives indicated by structural formula (a-2) below may be used for charge mobility reasons.

(a-1)

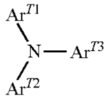

In structural formula (a-1), $Ar^{T1}$, $Ar^{T2}$, and $Ar^{T3}$ each independently indicate a substituted or unsubstituted aryl group, $-C_6H_4-C(R^{T4})=C(R^{T5})(R^{T6})$ or $-C_6H_4-CH=CH-CH=C(R^{T7})(R^{T8})$. $R^{T4}$, $R^{T5}$, $R^{T6}$, $R^{T7}$, and $R^{T8}$ each independently indicate a hydrogen atom, a substituted or unsubstituted alkyl group, or a substituted or unsubstituted aryl group. Examples of substituents for each of the above groups include a halogen atom, a C1 to C5 alkyl group, and a C1 to C5 alkoxy group. A substituted amino group substituted with one or more C1 to C3 alkyl groups is also an example of a substituent for each of the above groups.

(a-2)

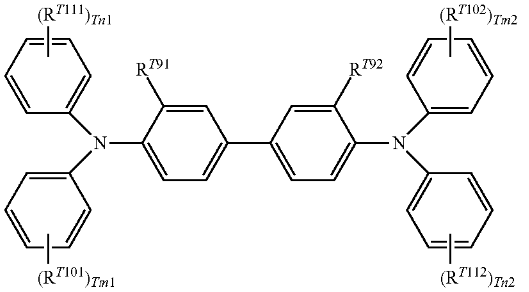

In structural formula (a-2), $R^{T9}1$ and $R^{T92}$ each independently indicate a hydrogen atom, a halogen atom, a C1 to C5 alkyl group, or a C1 to C5 alkoxy group. $R^{T101}$, $R^{T102}$, $R^{T111}$, and $R^{T112}$ each independently indicate a halogen atom, a C1 to C5 alkyl group, a C1 to C5 alkoxy group, an amino group substituted with one or more C1 or C2 alkyl groups, a substituted or unsubstituted aryl group, $-C(R^{T12})=C(R^{T13})(R^{T14})$ or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently indicate an integer of 0 or greater and 2 or less.

Examples of substituents for each of the above groups include a halogen atom, a C1 to C5 alkyl group, and a C1 to C5 alkoxy group. A substituted amino group substituted with one or more C1 to C3 alkyl groups is also an example of a substituent for each of the above groups.

Of the triarylamine derivatives indicated by structural formula (a-1) above and the benzidine derivatives indicated by structural formula (a-2) above, triarylamine derivatives having "$-C6H_4-CH=CH-CH=C(R^{T7})(R^{T8})$" and benzidine derivatives having "$-CH=CH-CH=C(R^{T15})(R^{T16})$" in particular, may be used for charge mobility reasons.

As the polymeric charge transport material, known polymeric materials having charge transport properties, such as poly-N-vinylcarbazole and polysilanes, are used. Polyester-based polymeric charge transport materials may be used in particular. The polymeric charge transport material may be used alone, but may also be used in combination with a binder resin.

Examples of binder resins used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole, and polysilanes. Of these, the binder resin may be a polycarbonate resin or polyarylate resin in particular. One such binder resin alone or two or more are used.

The blending ratio between the charge transport material and the binder resin may be from 10:1 to 1:5 as a ratio by mass.

In the charge transport layer, known additives may also be contained.

In the formation of the charge transport layer, there is no specific restriction, and known formation methods are utilized; however, for example, the process is performed by forming a coating of a coating solution for charge transport layer formation, which is obtained by adding the ingredients described above to at least one solvent, drying this coating, and optionally heating the dried coating.

Examples of solvents for preparing the coating solution for charge transport layer formation include common organic solvents, such as aromatic hydrocarbons, e.g., benzene, toluene, xylene, and chlorobenzene; ketones, e.g., acetone and 2-butanone; halogenated aliphatic hydrocarbons, e.g., methylene chloride, chloroform, and ethylene chloride; and cyclic or linear-chain ethers, e.g., tetrahydrofuran and ethyl ether. Such solvents are used individually or as a mixture of two or more.

Examples of methods for applying the coating solution for charge transport layer formation onto the charge-generating layer include common methods, such as blade coating, wire bar coating, spray coating, dip coating, bead coating, air knife coating, and curtain coating.

The thickness of the charge transport layer may be set within the range of, for example, 5 μm to 50 μm, preferably 10 μm to 30 μm.

Undercoat Layer

The undercoat layer is, for example, a layer containing inorganic particles and at least one binder resin.

An example of inorganic particles is inorganic particles having a powder resistance (volume resistivity) of $1\times10^2$ Ω·cm or more and $1\times10^{11}$ Ω·cm or less. Of such particles, the inorganic particles having such a resistance value may be, for example, metal oxide particles in particular, such as tin oxide particles, titanium oxide particles, zinc oxide particles, or zirconium oxide particles, and zinc oxide particles are preferred.

The specific surface area of the inorganic particles as measured by the BET method may be, for example, 10 $\mu m^2/g$ or more.

The volume-average diameter of the inorganic particles may be, for example, 50 nm or more and 2000 nm or less (preferably, 60 nm or more and 1000 nm or less).

The quantity of the inorganic particles may be, for example, 10% by mass or more and 80% by mass or less, preferably 40% by mass or more and 80% by mass or less, in relation to the binder resin.

The inorganic particles may have been subjected to surface treatment. As the inorganic particles, a mixture of two or more types with different surface treatments or different diameters may be used.

As for the surface treatment agent, examples include a silane coupling agent, a titanate coupling agent, an aluminum coupling agent, and a surfactant. A silane coupling agent may be used in particular, and a silane coupling agent having an amino group is preferred.

Examples of silane coupling agents having an amino group include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

A mixture of two or more silane coupling agents may also be used. For example, a silane coupling agent having an amino group and a different silane coupling agent may be used in combination. Examples for this different silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The method for the surface treatment with a surface treatment agent may be any method as long as it is a known method and may be any of a dry method or wet method.

The amount of the surface treatment agent used for the treatment may be, for example, 0.5% by mass or more and 10% by mass or less in relation to the inorganic particles.

The undercoat layer may contain an electron-accepting compound (acceptor compound) together with the inorganic particles because it may enhance the long-term stability of electrical properties and improve carrier-blocking properties.

Examples of electron-accepting compounds include electron-transporting substances, such as quinone compounds, e.g., chloranil and bromanil; tetracyanoquinodimethane compounds; fluorenone compounds, e.g., 2,4,7-trinitrofluorenone and 2,4,5,7-tetranitro-9-fluorenone; oxadiazole compounds, e.g., 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthone compounds; thiophene compounds; diphenoquinone compounds, e.g., 3,3',5,5'-tetra-t-butyldiphenoquinone; and benzophenone compounds.

The electron-accepting compound may be a compound having an anthraquinone structure in particular. Examples of compounds having an anthraquinone structure include hydroxyanthraquinone compounds, aminoanthraquinone compounds, and aminohydroxyanthraquinone compounds, with specific examples including anthraquinone, alizarin, quinizarin, anthrarufin, and purpurin.

In the undercoat layer, the electron-accepting compound may be contained dispersed together with the inorganic particles or may be contained in a state in which it has been attached to the surface of the inorganic particles.

Examples of methods for attaching the electron-accepting compound to the surface of the inorganic particles include a dry method or a wet method.

The dry method is, for example, a method in which the electron-accepting compound is attached to the surface of the inorganic particles by applying the electron-accepting compound, either directly or as a solution in an organic solvent, through dropwise addition or spraying with dry air or nitrogen gas while stirring the inorganic particles using equipment such as a mixer that produces a high shear force. When the electron-accepting compound is applied through dropwise addition or spraying, the process may be performed at a temperature equal to or lower than the boiling point of the solvent. After the dropwise addition or spraying of the electron-accepting compound, baking may additionally be performed at 100° C. or above. The baking temperature and the duration of baking are not particularly restricted as long as electrophotographic properties are obtained.

The wet method is, for example, a method in which the electron-accepting compound is attached to the surface of the inorganic particles by adding the electron-accepting compound while dispersing the inorganic particles in a solvent, for example by stirring or sonication or using a sand mill, attritor, or ball mill, stirring the mixture or dispersing the compound, and then removing the solvent. As for the method for solvent removal, the solvent is removed by, for example, filtration or distillation. After the solvent removal, baking may additionally be performed at 100° C. or above. The baking temperature and the duration of baking are not particularly limited as long as electrophotographic properties are obtained. In the wet method, water contained in the inorganic particles may be removed before the addition of the electron-accepting compound, and examples for it include the method of removing the water during stirring and heating in a solvent and the method of removing the water through azeotropic boiling with a solvent.

The attachment of the electron-accepting compound may be performed before or after subjecting the inorganic particles to surface treatment with a surface treatment agent, or the attachment of the electron-accepting compound and the surface treatment with a surface treatment agent may be performed simultaneously.

The amount of the electron-accepting compound may be, for example, 0.01% by mass or more and 20% by mass or less, preferably 0.01% by mass or more and 10% by mass or less, in relation to the inorganic particles.

Examples of binder resins used in the undercoat layer include known materials, such as known polymeric compounds, including acetal resins (e.g., polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organic titanium compounds; and silane coupling agents.

Resins such as electron-transporting resins, which have an electron-transporting group, and conductive resins (e.g., polyanilines) are also examples of binder resins used in the undercoat layer.

Of these, the binder resin used in the undercoat layer may be, in particular, a resin insoluble in the solvent that is applied when the upper layer is formed, preferably a thermosetting resin, such as a urea resin, phenolic resin, phenol-formaldehyde resin, melamine resin, urethane resin, unsaturated polyester resin, alkyd resin, or epoxy resin; or a resin obtained through the reaction between a curing agent and at least one resin selected from the group consisting of a polyamide resin, a polyester resin, a polyether resin, a methacrylic resin, an acrylic resin, a polyvinyl alcohol resin, and a polyvinyl acetal resin.

When two or more of such binder resins are used in combination, their mixing percentages are selected as appropriate.

In the undercoat layer, various additives may be contained for the improvement of electrical properties, the improvement of environmental stability, and the improvement of image quality.

Examples of additives include known materials, such as electron-transporting pigments, e.g., condensed polycyclic and azo pigments, zirconium chelate compounds, titanium chelate compounds, aluminum chelate compounds, titanium alkoxide compounds, organic titanium compounds, and silane coupling agents. As mentioned above, silane coupling agents are used for surface treatment of the inorganic particles; however, they may also be added to the undercoat layer as additives.

Examples of silane coupling agents as additives include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of zirconium chelate compounds include zirconium butoxide, zirconium ethylacetoacetate, zirconium triethanolamine, acetylacetonate zirconium butoxide, ethylacetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of titanium chelate compounds include tetraisopropyl titanate, tetra-normal-butyl titanate, the butyl titanate dimer, tetra(2-ethylhexyl) titanate, titanium acetylacetonate, polytitanium acetylacetonate, titanium octylene glycolate, the titanium lactate ammonium salt, titanium lactate, the titanium lactate ethyl ester, titanium triethanolaminate, and polyhydroxytitanium stearate.

Examples of aluminum chelate compounds include aluminum isopropylate, monobutoxyaluminum diisopropylate, aluminum butyrate, diethylacetoacetate aluminum diisopropylate, and aluminum tris(ethylacetoacetate).

Such additives may be used individually or as a mixture or polycondensate of multiple compounds.

The undercoat layer may have a Vickers hardness of 35 or greater.

The surface roughness (ten-point height of roughness profile) of the undercoat layer may have been adjusted, for the reduction of moiré fringes, to fall within the range of 1/(4n) (where n is the refractive index of the upper layer) to ½ of the wavelength, of the laser for exposure used.

Resin particles, for example, may be incorporated into the undercoat layer for the adjustment of surface roughness. Examples of resin particles include silicone resin particles and crosslinked polymethyl methacrylate resin particles. The surface of the undercoat layer, furthermore, may be polished for the adjustment of surface roughness. Examples of polishing methods include buff polishing, sandblasting treatment, wet honing, and grinding treatment.

In the formation of the undercoat layer, there is no specific restriction, and known formation methods are utilized; however, for example, the process is performed by forming a coating of a coating solution for undercoat layer formation, which is obtained by adding the ingredients described above to a solvent, drying this coating, and optionally heating the dried coating.

Examples of solvents for preparing the coating solution for undercoat layer formation include known organic solvents, such as alcohol solvents, aromatic hydrocarbon solvents, halogenated hydrocarbon solvents, ketone solvents, ketone alcohol solvents, ether solvents, and ester solvents.

Specific examples of such solvents include common organic solvents, such as methanol, ethanol, n-propanol, isopropanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of methods for dispersing the inorganic particles in preparing the coating solution for undercoat layer formation include known methods, such as a roller mill, a ball mill, a vibration ball mill, an attritor, a sand mill, a colloid mill, and a paint shaker.

Examples of methods for applying the coating solution for undercoat layer formation onto the conductive substrate include common methods, such as blade coating, wire bar coating, spray coating, dip coating, bead coating, air knife coating, and curtain coating.

The thickness of the undercoat layer may be set within the range of, for example, 15 μm or more, preferably 20 μm to 50 μm.

Intermediate Layer

Although not illustrated in the drawings, an intermediate layer may additionally be provided between the undercoat layer and the photosensitive layer.

The intermediate layer is, for example, a layer containing at least one resin. Examples of resins used in the intermediate layer include polymeric compounds such as acetal resins (e.g., polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may be a layer containing at least one organometallic compound. Examples of organometallic compounds used in the intermediate layer include organometallic compounds containing a metal atom of, for example, zirconium, titanium, aluminum, manganese, or silicon.

Such compounds used in the intermediate layer may be used individually or as a mixture or polycondensate of multiple compounds.

Of these, the intermediate layer may be, in particular, a layer containing an organometallic compound containing a zirconium atom or silicon atom.

In the formation of the intermediate layer, there is no specific restriction, and known formation methods are utilized; however, for example, the process is performed by forming a coating of a coating solution for intermediate layer formation, which is obtained by adding the ingredients described above to a solvent, drying this coating, and optionally heating the dried coating.

As the coating method by which the intermediate layer is formed, common methods, such as dip coating, push coating, wire bar coating, spray coating, blade coating, air knife coating, and curtain coating, are used.

The thickness of the intermediate layer may be set within the range of 0.1 μm to 3 μm. It is possible to use the intermediate layer as the undercoat layer.

Protective Layer

The protective layer is optionally provided on the photosensitive layer. The protective layer is provided for the purpose of, for example, preventing chemical changes in the photosensitive layer associated with charging and further improving mechanical strength of the photosensitive layer.

As the protective layer, therefore, a layer that is a cured film (crosslinked film) may be used. Examples of such layers include layers presented in 1) or 2) below.

1) A layer that is a film formed through the curing of a composition containing a reactive group-containing charge transport material, a material that has a reactive group and a charge-transporting backbone in the same molecule (i.e., a layer containing a polymer or crosslinked form of the reactive group-containing charge transport material)
2) A layer that is a film formed through the curing of a composition containing a nonreactive charge transport material and a reactive group-containing non-charge transport material, a material that lacks a charge-transporting backbone and has a reactive group (i.e., a layer containing a polymer or crosslinked form of the nonreactive charge transport material and the reactive group-containing non-charge transport material)

Examples of reactive groups in the reactive group-containing charge transport material include known reactive groups, such as a chain-polymerizable group, an epoxy group, —OH, —OR [where R indicates an alkyl group], $—NH_2$, —SH, —COOH, $—SiRQ_{3-Qn}(OR^{Q2})_{Qn}$ [Where $R^{Q1}$ represents a hydrogen atom, alkyl group, or substituted or unsubstituted aryl group, and $R^{Q2}$ represents a hydrogen atom, alkyl group, or trialkylsilyl group. Qn represents an integer of 1 to 3].

The chain-polymerizable group is not particularly limited as long as it is a functional group capable of radical polymerization; for example, it is a functional group that has at least a group containing a carbon double bond. Specific examples include groups containing at least one selected from a vinyl group, a vinyl ether group, a vinyl thioether group, a styryl group (vinyl phenyl group), an acryloyl group, a methacryloyl group, and their derivatives. In particular, the chain-polymerizable group may be a group containing at least one selected from a vinyl group, a styryl group (vinyl phenyl group), an acryloyl group, a methacryloyl group, and their derivatives because it may be superior in its reactivity.

The charge-transporting backbone in the reactive group-containing charge transport material is not particularly limited as long as it is a known structure in the field of electrophotographic photoreceptors, and an example is a backbone structure derived from a nitrogen-containing hole-transporting compound, such as a triarylamine compound, benzidine compound, or hydrazone compound, and conjugated with the nitrogen atom(s). Of these, a triarylamine backbone may be used in particular.

These reactive group-containing charge transport material, which has a reactive group and a charge-transporting backbone, nonreactive charge transport material, and reactive group-containing non-charge transport material can be selected from known materials.

In the protective layer, known additives may also be contained.

In the formation of the protective layer, there is no specific restriction, and known formation methods are utilized; however, for example, the process is performed by forming a coating of a coating solution for protective layer formation, which is obtained by adding the ingredients described above to at least one solvent, drying this coating, and optionally conducting curing treatment, such as heating Examples of solvents for preparing the coating solution for protective layer formation include aromatic solvents, such as toluene and xylene; ketone solvents, such as methyl ethyl ketone, methyl isobutyl ketone, and cyclohexanone; ester solvents, such as ethyl acetate and butyl acetate; ether solvents, such as tetrahydrofuran and dioxane; cellosolve solvents, such as ethylene glycol monomethyl ether; and alcohol solvents, such as isopropyl alcohol and butanol. Such solvents are used individually or as a mixture of two or more.

The coating solution for protective layer formation may be a solventless coating liquid.

Examples of methods for applying the coating solution for protective layer formation onto the photosensitive layer (e.g., the charge transport layer) include common methods, such as dip coating, push coating, wire bar coating, spray coating, blade coating, air knife coating, and curtain coating.

The thickness of the protective layer may be set within the range of, for example, 1 μm to 20 μm, preferably 2 μm to 10 μm.

Single-Layer Photosensitive Layer

The single-layer photosensitive layer (charge-generating/charge transport layer) is, for example, a layer containing a charge-generating material and at least one charge transport material, optionally with at least one binder resin and other known additives. The materials are the same as the materials described in relation to the charge-generating layer and the charge transport layer.

In the single-layer photosensitive layer, the amount of the charge-generating material may be 0.1% by mass or more and 10% by mass or less, preferably 0.8% by mass or more and 5% by mass or less, in relation to the total solids content. In the single-layer photosensitive layer, the amount of the charge transport material may be 5% by mass or more and 50% by mass or less in relation to the total solids content.

The method for forming the single-layer photosensitive layer is similar to the methods for forming the charge-generating layer and the charge transport layer.

The thickness of the single-layer photosensitive layer may be, for example, 5 μm or more and 50 μm or less, preferably 10 μm or more and 40 μm or less.

Image Forming Apparatus and Process Cartridge

An image forming apparatus according to an exemplary embodiment includes an electrophotographic photoreceptor, a charging device that charges the surface of the electrophotographic photoreceptor, an electrostatic latent image forming device that forms an electrostatic latent image on the charged surface of the electrophotographic photoreceptor, a developing device that develops, using a developer containing toner, the electrostatic latent image on the surface of the electrophotographic photoreceptor to form a toner image, and a transfer device that transfers the toner image to the surface of a recording medium. As the electrophotographic photoreceptor, furthermore, an electrophotographic photoreceptor according to an exemplary embodiment is used.

The configuration of the image forming apparatus according to this exemplary embodiment can be applied to known types of image forming apparatuses, such as an apparatus that includes a fixing device that fixes a toner image transferred to the surface of a recording medium; a direct-transfer apparatus, which forms a toner image on the surface of an electrophotographic photoreceptor and transfers it directly to a recording medium; an intermediate-transfer apparatus, which forms a toner image on the surface of an electrophotographic photoreceptor, transfers it to the surface of an intermediate transfer body (first transfer), and transfers the toner image on the surface of the intermediate transfer body to the surface of a recording medium (second transfer); an apparatus that includes a cleaning device that cleans the surface of an electrophotographic photoreceptor between the transfer of a toner image and charging; an apparatus that includes a static eliminator that removes static electricity from the surface of an electrophotographic photoreceptor by irradiating the surface with antistatic light between the transfer of a toner image and charging; and an apparatus that includes an electrophotographic photoreceptor heater for increasing the temperature of an electrophotographic photoreceptor and thereby lowering relative temperatures.

In the case of an intermediate-transfer apparatus, the transfer device has a configuration in which it has, for example, an intermediate transfer body, which has a surface onto which the toner image is transferred, a first transfer device, which transfers the toner image formed on the surface of the electrophotographic photoreceptor to the surface of the intermediate transfer body (first transfer), and a second transfer device, which transfers the toner image on the surface of the intermediate transfer body to the surface of the recording medium (second transfer).

The image forming apparatus according to this exemplary embodiment may be any of a dry-development image forming apparatus or wet-development (a development method in which a liquid developer is used) image forming apparatus.

For the image forming apparatus according to this exemplary embodiment, a portion that includes the electrophotographic photoreceptor, for example, may be in a cartridge structure, which allows this portion to be detached from and attached to the image forming apparatus (or the portion may be a process cartridge). As the process cartridge, a process cartridge that includes an electrophotographic photoreceptor according to an exemplary embodiment, for example, may be used. The process cartridge may include, for example, at least one selected from the group consisting of the charging device, the electrostatic latent image forming device, the developing device, and the transfer device besides the electrophotographic photoreceptor.

An example of an image forming apparatus according to this exemplary embodiment will now be presented; the apparatus, however, is not limited to this example. Structural elements illustrated in the drawings will be described, and the remaining elements will not be described.

Figure 3:
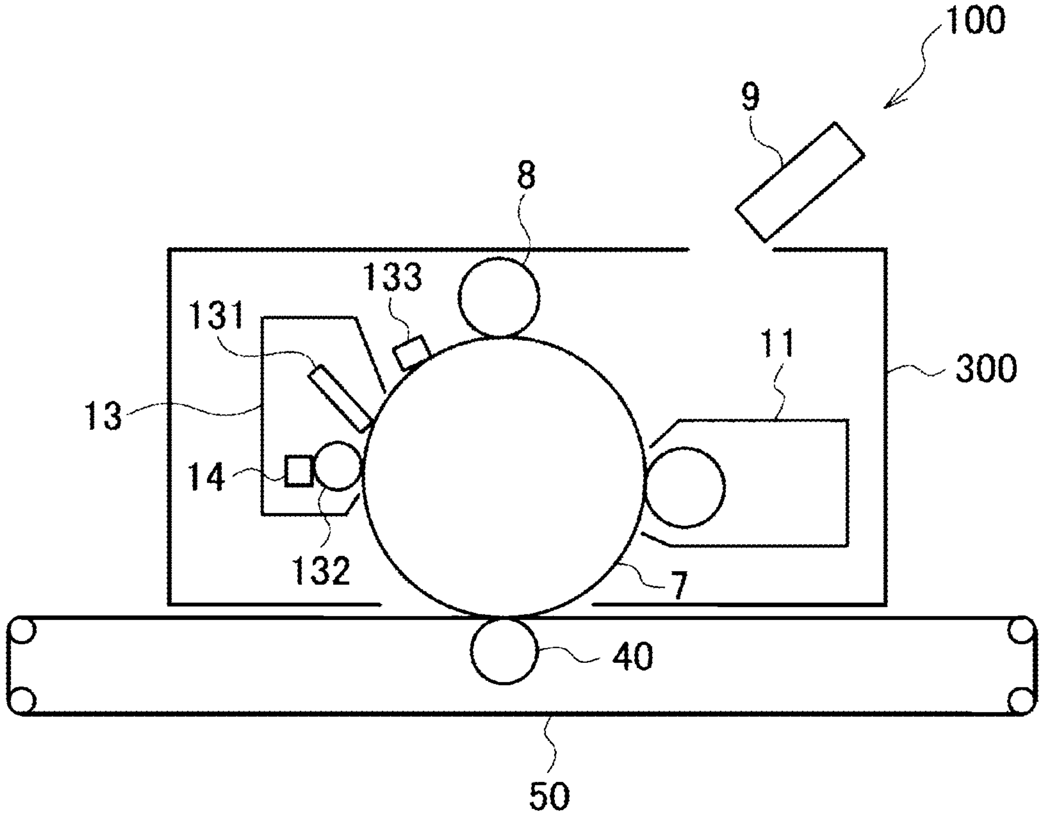
FIG. 3 is a schematic view illustrating the structure of an example of an image forming apparatus according to an exemplary embodiment.

FIG. 3 is a schematic view illustrating the structure of an example of an image forming apparatus according to this exemplary embodiment.

As illustrated in FIG. 3, an image forming apparatus 100 according to this exemplary embodiment includes a process cartridge 300 that includes an electrophotographic photoreceptor 7, an exposure device 9 (an example of an electrostatic latent image forming device), a transfer device 40 (a first transfer device), and an intermediate transfer body 50. For the image forming apparatus 100, the exposure device 9 is disposed at a position at which it can illuminate the electrophotographic photoreceptor 7 with light through an opening in the process cartridge 300, the transfer device 40 is disposed at a position at which it faces the electrophotographic photoreceptor 7 with the intermediate transfer body 50 interposed therebetween, and the intermediate transfer body 50 is disposed with part of it in contact with the electrophotographic photoreceptor 7. Although not illustrated in the drawing, the apparatus also has a second transfer device, which transfers a toner image on the intermediate transfer body 50 to a recording medium (e.g., paper). The intermediate transfer body 50, the transfer device 40 (first transfer device), and the second transfer device (not illustrated) correspond to an example of a transfer device.

The process cartridge 300 in FIG. 3 holds the electrophotographic photoreceptor 7, a charging device 8 (an example of a charging device), a developing device 11 (an example of a developing device), and a cleaning device 13 (an example of a cleaning device) together inside a housing. The cleaning device 13 has a cleaning blade (an example of a cleaning member) 131, and the cleaning blade 131 is disposed to make contact with the surface of the electrophotographic photoreceptor 7. The cleaning member may be a conductive or insulating fibrous member rather than being in the form of a cleaning blade 131, and this fibrous member may be used alone or in combination with a cleaning blade 131.

In FIG. 3, an example is illustrated in which the image forming apparatus includes a fibrous member 132 (shaped like a roller) that supplies lubricant 14 to the surface of the electrophotographic photoreceptor 7 and a fibrous member 133 (shaped like a flat brush) that assists in cleaning; these components, however, are optional.

Each component of the image forming apparatus according to this exemplary embodiment will now be described.

Charging Device

As the charging device 8, a contact charger made with a conductive or semiconducting charging roller, charging brush, charging film, charging rubber blade, or charging tube, for example, is used. Devices such as chargers known per se, including a roller charger of noncontact type and scorotron and corotron chargers, whose operation is based on corona discharge, are also used.

Exposure Device

An example of an exposure device 9 is a piece of optical equipment that illuminates the surface of the electrophotographic photoreceptor 7 with light, such as light from a semiconductor laser, LED, or liquid crystal shutter, in the shape of a predetermined image. The wavelength of the light source is set within the spectral sensitivity range of the electrophotographic photoreceptor. In terms of the wavelength of a semiconductor laser, near-infrared lasers having their oscillation wavelength around 780 nm are the mainstream. The wavelength, however, is not limited to this; lasers with an oscillation wavelength in the 600-nm range and lasers having their oscillation wavelength in the range of 400 nm to 450 nm as blue lasers may also be utilized. If the formation of a color image is intended, furthermore, a surface-emitting laser light source of the type that can produce multiple beams may also be an option.

Developing Device

An example of a developing device 11 is a commonly used developing device, which develops a latent image using a developer with or without contact. There is no specific restriction on the developing device 11 as long as it has the function described above; the device is selected according to the purpose. An example is a known developing unit having the function of attaching a one-component developer or two-component developer to the electrophotographic photoreceptor 7, for example using a brush or roller. A developing unit that uses a developing roller holding a developer on its surface may be employed in particular.

The developer used with the developing device 11 may be a one-component developer, which is substantially just the toner itself, or may be a two-component developer, which contains the toner and a carrier. The developer, furthermore, may be magnetic or may be nonmagnetic. As such developers, known ones are used.

Cleaning Device

As the cleaning device 13, a device of cleaning-blade type, which includes a cleaning blade 131, is used. Besides the cleaning blade type, a fur-brush cleaning type or simultaneous development and cleaning type device may also be employed.

Transfer Device

Examples of transfer devices 40 include transfer chargers known per se, such as contact transfer chargers, for example made with a belt, roller, film, or rubber blade, and scorotron and corotron transfer chargers, whose operation is based on corona discharge.

Intermediate Transfer Body

As the intermediate transfer body 50, belt-shaped types (intermediate transfer belts) are used, including those made of polyimide, polyamide-imide, polycarbonate, polyarylate, polyester, and rubber, for example, with imparted semiconducting properties. In terms of the shape of the intermediate transfer body, furthermore, a drum-shaped type may also be used besides the belt-shaped type.

Figure 4:
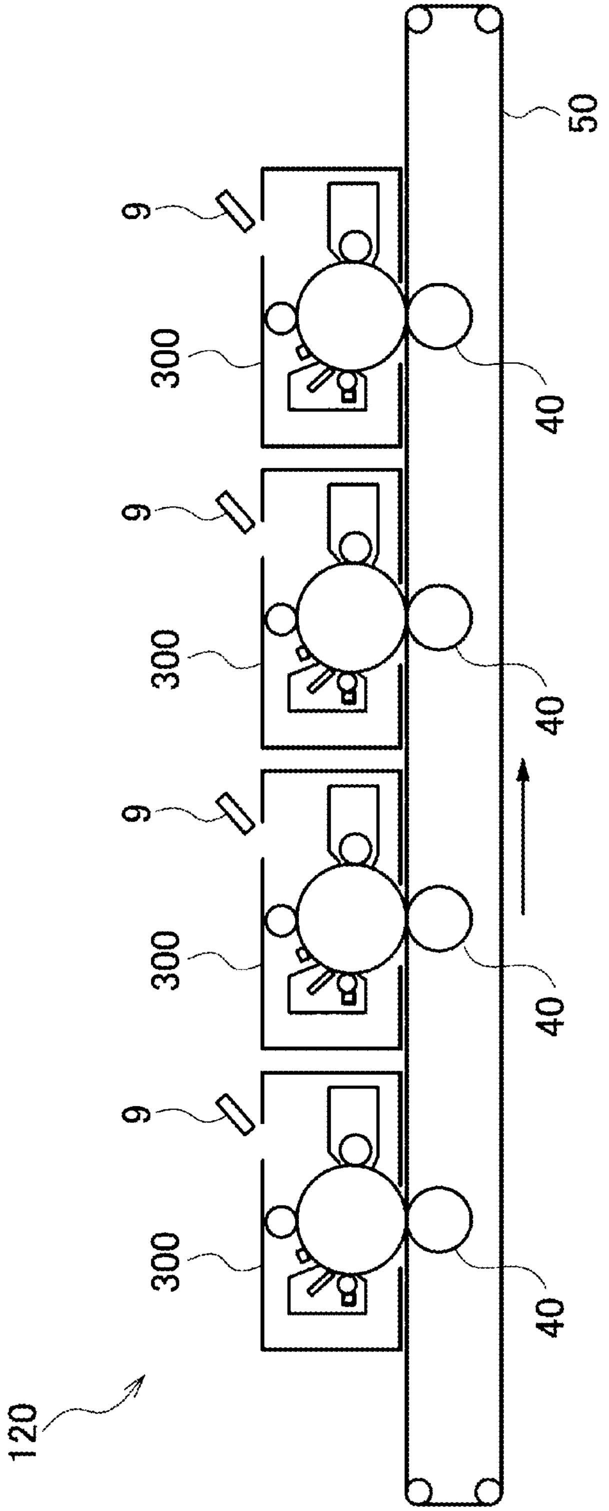
FIG. 4 is a schematic view illustrating the structure of another example of an image forming apparatus according to an exemplary embodiment.

FIG. 4 is a schematic view illustrating the structure of another example of an image forming apparatus according to this exemplary embodiment.

The image forming apparatus 120 illustrated in FIG. 4 is a multicolor image forming apparatus in the tandem system equipped with four process cartridges 300. The image forming apparatus 120 has a configuration in which the four process cartridges 300 are arranged in parallel on the intermediate transfer body 50, with one electrophotographic photoreceptor used per color. Except for being in the tandem system, the image forming apparatus 120 has the same structure as the image forming apparatus 100.

Method for Manufacturing a Conductive Substrate for an Electrophotographic Photoreceptor A method according to an exemplary embodiment for manufacturing a conductive substrate for an electrophotographic photoreceptor includes: a step of subjecting the inner circumferential surface of a conductive substrate at both end portions in the axial direction to processing treatment by water jetting to make the sum S of intensity 0.02 or greater and 0.10 or less within the period range of 0.01 mm to 0.1 mm in a power spectrum obtained through fast Fourier transform of the roughness profile in the axial direction of the inner circumferential surface of the conductive substrate at the both end portions in the axial direction (Hereinafter also referred to as "the processing treatment step.").

Processing Treatment Step

In the processing treatment step, the inner circumferential surface of a (cylindrical) conductive substrate at both end portions in the axial direction is subjected to processing treatment by water jetting. Water jetting may be used because it may pose little risk of chemically altering or contaminating the surface of the conductive substrate and, furthermore, allow the desired sum S to be imparted to the conductive substrate.

In the processing treatment step, the sum S of intensity within the period range of 0.01 mm to 0.1 mm in a power spectrum obtained through fast Fourier transform of the roughness profile in the axial direction of the inner circumferential surface of the conductive substrate at both end portions in the axial direction is adjusted to 0.02 or greater and 0.10 or less through water jetting. By ensuring that the sum S falls within this range, wobbling during rotation may be reduced when the conductive substrate is applied to an image forming apparatus. Possible ranges for the sum S are the same as the possible ranges for the sum S described in relation to the conductive substrate according to the above exemplary embodiment for an electrophotographic photoreceptor.

The pressure, amount, and temperature of the water for water jetting are not restricted as long as it can be ensured that the sum S falls within the above predetermined range and can be selected according to the material for the conductive substrate. The water used for the water jetting may be water to which a surfactant has been added.

In terms of the form of the processing treatment by water jetting, there is no specific restriction as long as it can be ensured that the sum S falls within the above predetermined range.

For example, when the method according to this exemplary embodiment for manufacturing a conductive substrate for an electrophotographic photoreceptor is utilized in a method for recycling a conductive substrate for an electrophotographic photoreceptor, the processing treatment by water jetting may be performed, after the immersion of a used photoreceptor in a solvent, simultaneously with removing all or some softened layers on the outer circumferential surface by water jetting or may be performed after the removal. Alternatively, for example, the processing treatment may be performed simultaneously with removing all or some layers on the outer circumferential surface by air blasting or may be performed after the removal.

On the inner circumferential surface of a used photoreceptor, furthermore, there are substances adhering thereto, such as an adhesive agent, dry residue of coating solutions for photosensitive layer formation, and resin from flanges. These adhering substances also cause the wobbling of the photoreceptor. The processing treatment by water jetting, therefore, may also serve the purpose of treatment for removing adhering substances. When this approach is employed, the pressure, amount, and temperature of the water for water jetting are set to parameters with which the sum S falls within the range specified above while the adhering substances are removed.

EXAMPLES

Exemplary embodiments of the present disclosure will now be described in detail by examples; exemplary embodiments of the present disclosure, however, are not limited to these examples.

In the following description, "parts" and "%" are by mass unless stated otherwise.

Example 1

A photoreceptor is fabricated through the following procedure.

Production of a Conductive Substrate

A used photoreceptor is prepared. This photoreceptor includes an aluminum cylindrical tube used for its manufacture.

With this used photoreceptor, its conductive substrate (outer diameter, 30 mm; length, 250 mm; wall thickness, 1 mm) is produced (recycled) by removing all layers on its outer circumferential surface by water jetting while subjecting the inner circumferential surface to processing treatment by water jetting (conditions: water pressure, 100 MPa) in such a manner that the sum S will be the value in Table 1.

Formation of an Undercoat Layer

Twenty parts of a blocked isocyanate (trade name, Sumidur BL3175; manufactured by Sumitomo Bayer Urethane Co., Ltd.; solids content, 75%) and 7.5 parts of a butyral resin (polyvinyl butyral; S-LEC BL-1, manufactured by Sekisui Chemical Co., Ltd.) are dissolved in 150 parts of methyl ethyl ketone. Thirty-four parts of a mixture of perinone compound (1-1) and perinone compound (2-1) (ratio by mass, 50:50) is mixed into this solution, and 10 hours of dispersion is performed in a sand mill using 1-mm diameter glass beads to give a dispersion. To this dispersion is added 0.005 parts of a bismuth carboxylate (K-KAT XK-640, manufactured by King Industries, Inc.), yielding a coating solution for undercoat layer formation. This coating solution is applied to the outer circumferential surface of the conductive substrate by dip coating, and 60 minutes of curing by drying is performed under 160° C. conditions; in this manner, an undercoat layer having a thickness of 20 μm is formed.

Perinone compound (1-1)

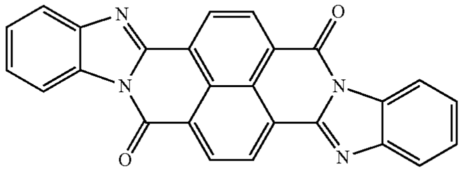

Perinone compound (2-1)

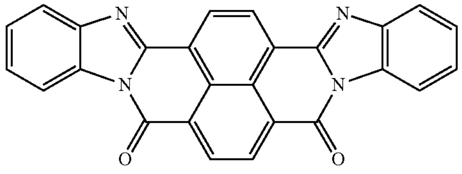

Formation of a Charge-Generating Layer

A mixture consisting of 15 parts of hydroxygallium phthalocyanine (having diffraction peaks at least at the positions of 7.5°, 9.9°, 12.5°, 16.3°, 18.6°, 25.1°, and 28.3° as Bragg angles (2°±0.2°) in an x-ray diffraction spectrum obtained using characteristic x-rays of CuKα.) as a charge-generating material, 10 parts of a vinyl chloride-vinyl acetate copolymer resin (trade name, VMCH; manufactured by Nippon Unicar Company Limited) as a binder resin, and 200 parts of n-butyl acetate is dispersed in a sand mill using 1-mm diameter glass beads for 4 hours. The dispersion is stirred with 175 parts of n-butyl acetate and 180 parts of methyl ethyl ketone added thereto, yielding a coating solution for charge-generating layer formation. This coating solution is applied onto the undercoat layer by dip coating and dried at room temperature; in this manner, a charge-generating layer having a thickness of 0.25 μm is formed.

Formation of a Charge Transport Layer

Sixty parts of polycarbonate resin (1) (viscosity-average molecular weight, 40000; the numeric values in the structural formulae below are molar ratios) and 40 parts of CTM-1, which is a charge transport material, are dissolved in a solvent mixture obtained by mixing 270 parts of tetrahydrofuran and 30 parts of toluene, giving a coating solution for charge transport layer formation. This coating solution is applied onto the charge-generating layer by dip coating, and the coating film is dried at a temperature of 150° C. for 30 minutes; in this manner, a charge transport layer having a thickness of 20 μm is formed.

Polycarbonate resin (1)

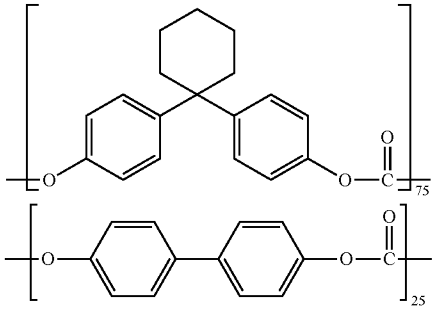

CTM-1

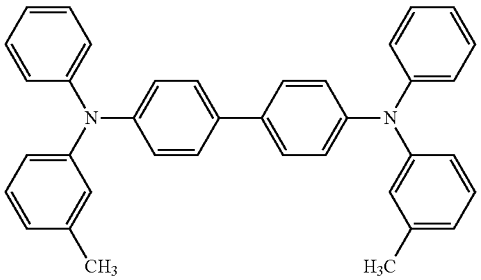

Examples 2 to 5 and Comparative Examples 2 and 3

A photoreceptor is fabricated in the same manner as in Example 1, except that the processing treatment is performed in such a manner that the sum S will be the value in Table 1 by changing the conditions (water pressure) for water jetting according to Table 1.

Comparative Example 1

A photoreceptor is fabricated in the same manner as in Example 1, except that the conductive substrate used is a newly manufactured one (an aluminum cylindrical tube having an outer diameter of 30 mm, a length of 250 mm, and a wall thickness of 1 mm) and that the processing treatment by water jetting is not performed.

Evaluation

Image Quality

For the photoreceptors fabricated in the Examples and Comparative Examples, each is integrated as a photoreceptor into a modified version of "DocuColor-7171P," manufactured by FUJIFILM Business Innovation Corp., halftone images with 5% increments of image density from 5% to 100% are formed side by side in the color of cyan on A3-sized ordinary printing paper in an environment with a temperature of 23° C. and a relative humidity of 55%, and the occurrence of image quality defects caused by the wobbling of the photoreceptor during rotation (unevenness in image density) is visually evaluated. The evaluation is performed according to the following criteria.

A: No unevenness in image density occurs

B: Slight unevenness in image density occurs (acceptable)

C: Unevenness in image density occurs

D: Unevenness in image density occurs to such a severe degree that images are erased The results are presented in Table 1.

TABLE 1

| | Sum S | Classification | Processed | Water pressure (MPa) | Image quality evaluation |
|---|---|---|---|---|---|
| Example 1 | 0.02 | Recycled | Yes | 100 | B |
| Example 2 | 0.05 | Recycled | Yes | 120 | A |
| Example 3 | 0.10 | Recycled | Yes | 150 | B |
| Example 4 | 0.03 | Recycled | Yes | 110 | A |
| Example 5 | 0.07 | Recycled | Yes | 130 | A |
| Comparative Example 1 | 0.01 | Newly manufactured | No | 0 | C |
| Comparative Example 2 | 0.11 | Recycled | Yes | 160 | C |
| Comparative Example 3 | 0.20 | Recycled | Yes | 220 | D |

As shown in Table 1, it can be understood that with the photoreceptors in the Examples, made using a conductive substrate for which the sum S is from 0.02 to 0.10, image quality defects caused by the wobbling of the photoreceptor during rotation (unevenness in image density) may be reduced compared with the photoreceptors in the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A conductive substrate for an electrophotographic photoreceptor, the conductive substrate including a cylindrical conductive substrate, wherein:

in a power spectrum obtained through fast Fourier transform of a roughness profile in an axial direction of an inner circumferential surface of the conductive substrate at both end portions in the axial direction, a sum S of intensity within a period range of 0.01 mm to 0.1 mm is 0.02 or greater and 0.10 or less.

(((2))) The conductive substrate according to (((1))) for an electrophotographic photoreceptor, wherein:

the sum S is 0.03 or greater and 0.08 or less.

(((3))) An electrophotographic photoreceptor including:

the conductive substrate according to (((1))) or (((2))) and a photosensitive layer disposed on or above the conductive substrate.

(((4))) A process cartridge attachable to and detachable from an image forming apparatus, the process cartridge including:

the electrophotographic photoreceptor according to (((3))).

(((5))) An image forming apparatus including:

the electrophotographic photoreceptor according to (((3)));

a charging device that charges a surface of the electrophotographic photoreceptor;

an electrostatic latent image forming device that forms an electrostatic latent image on the charged surface of the electrophotographic photoreceptor;

a developing device that develops, using a developer containing toner, the electrostatic latent image on the surface of the electrophotographic photoreceptor to form a toner image; and a transfer device that transfers the toner image to a surface of a recording medium.

(((6))) A method for manufacturing a conductive substrate for an electrophotographic photoreceptor, the method including:

subjecting an inner circumferential surface of a conductive substrate at both end portions in an axial direction to processing treatment by water jetting to make a sum S of intensity 0.02 or greater and 0.10 or less within a period range of 0.01 mm to 0.1 mm in a power spectrum obtained through fast Fourier transform of a roughness profile in the axial direction of the inner circumferential surface of the conductive substrate at the both end portions in the axial direction.

What is claimed is:

1. A conductive substrate for an electrophotographic photoreceptor, the conductive substrate comprising a cylindrical conductive substrate, wherein:

in a power spectrum obtained through fast Fourier transform of a roughness profile in an axial direction of an inner circumferential surface of the conductive substrate at both end portions in the axial direction, a sum S of intensity within a period range of 0.01 mm to 0.1 mm is 0.02 or greater and 0.10 or less.

2. The conductive substrate according to claim 1 for an electrophotographic photoreceptor, wherein:

the sum S is 0.03 or greater and 0.08 or less.

3. An electrophotographic photoreceptor comprising:

the conductive substrate according to claim 2 and a photosensitive layer disposed on or above the conductive substrate.

4. A process cartridge attachable to and detachable from an image forming apparatus, the process cartridge comprising:

the electrophotographic photoreceptor according to claim 3.

5. An image forming apparatus comprising:
the electrophotographic photoreceptor according to claim 3;
a charging device that charges a surface of the electrophotographic photoreceptor;
an electrostatic latent image forming device that forms an electrostatic latent image on the charged surface of the electrophotographic photoreceptor;
a developing device that develops, using a developer containing toner, the electrostatic latent image on the surface of the electrophotographic photoreceptor to form a toner image; and
a transfer device that transfers the toner image to a surface of a recording medium.

6. An electrophotographic photoreceptor comprising:
the conductive substrate according to claim 1 and a photosensitive layer disposed on or above the conductive substrate.

7. A process cartridge attachable to and detachable from an image forming apparatus, the process cartridge comprising:
the electrophotographic photoreceptor according to claim 6.

8. An image forming apparatus comprising:
the electrophotographic photoreceptor according to claim 6;
a charging device that charges a surface of the electrophotographic photoreceptor;
an electrostatic latent image forming device that forms an electrostatic latent image on the charged surface of the electrophotographic photoreceptor;
a developing device that develops, using a developer containing toner, the electrostatic latent image on the surface of the electrophotographic photoreceptor to form a toner image; and
a transfer device that transfers the toner image to a surface of a recording medium.

9. A method for manufacturing a conductive substrate for an electrophotographic photoreceptor, the method comprising:
subjecting an inner circumferential surface of a conductive substrate at both end portions in an axial direction to processing treatment by water jetting to make a sum S of intensity 0.02 or greater and 0.10 or less within a period range of 0.01 mm to 0.1 mm in a power spectrum obtained through fast Fourier transform of a roughness profile in the axial direction of the inner circumferential surface of the conductive substrate at the both end portions in the axial direction.

* * * * *